US011625994B2

(12) United States Patent
Ebeling et al.

(10) Patent No.: US 11,625,994 B2
(45) Date of Patent: *Apr. 11, 2023

(54) VIBROTACTILE CONTROL SYSTEMS AND METHODS

(71) Applicant: Not Impossible, LLC, Venice, CA (US)

(72) Inventors: Mick Ebeling, Venice, CA (US); Daniel Biscaro Loureiro, Philadelphia, PA (US); Patrick Hanlon, Brooklyn, NY (US); David Francis Putrino, New York, NY (US)

(73) Assignee: Not Impossible, LLC, Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/301,122

(22) Filed: Mar. 25, 2021

(65) Prior Publication Data

US 2021/0366250 A1    Nov. 25, 2021

Related U.S. Application Data

(63) Continuation of application No. 16/881,443, filed on May 22, 2020, now Pat. No. 10,964,179, which is a
(Continued)

(51) Int. Cl.
*G08B 6/00* (2006.01)
*G10H 1/045* (2006.01)
(Continued)

(52) U.S. Cl.
CPC ............... *G08B 6/00* (2013.01); *G09B 15/02* (2013.01); *G09B 19/0015* (2013.01);
(Continued)

(58) Field of Classification Search
CPC ...... G08B 6/00; G09B 15/02; G09B 19/0015; G09B 19/0038; G09B 21/009;
(Continued)

(56) References Cited

U.S. PATENT DOCUMENTS

| 5,290,964 A | 3/1994 | Nakada et al. |
| 5,314,403 A | 5/1994 | Shaw |
| 5,368,359 A | 11/1994 | Eakin |
| 5,553,148 A | 9/1996 | Werle |
| 6,093,164 A | 7/2000 | Davis et al. |

(Continued)

FOREIGN PATENT DOCUMENTS

| CA | 2982291 A1 | 4/2019 |
| CN | 203953629 U | 11/2014 |

(Continued)

OTHER PUBLICATIONS

Nanayakkara, S.C. et al.; "Enhancing Musical Experience for the Hearing-impaired using Visual and Haptic Displays"; Jan. 2012; pp. 1-42; Human-Computer Interaction; vol. 28 No.2.
(Continued)

*Primary Examiner* — James J Yang
(74) *Attorney, Agent, or Firm* — Fortem IP LLP

(57) ABSTRACT

Methods and systems are disclosed to facilitate creating the sensation of vibrotactile movement on the body of a user. Vibratory motors are used to generate a haptic language for music or other stimuli that is integrated into wearable technology. The disclosed system in certain embodiments enables the creation of a family of devices that allow people such as those with hearing impairments to experience sounds such as music or other input to the system. For example, a "sound vest" or other wearable array transforms musical input to haptic signals so that users can experience their favorite music in a unique way, and can also recognize auditory or other cues in the user's real or virtual reality environment and convey this information to the user using haptic signals.

20 Claims, 14 Drawing Sheets

Related U.S. Application Data continuation of application No. 15/381,610, filed on Dec. 16, 2016, now abandoned, which is a continuation-in-part of application No. 14/713,908, filed on May 15, 2015, now Pat. No. 9,679,546.

(60) Provisional application No. 61/994,753, filed on May 16, 2014.

(51) Int. Cl.

| | | |
|---|---|---|
| *G09B 15/02* | (2006.01) | |
| *H04R 1/02* | (2006.01) | |
| *G09B 21/00* | (2006.01) | |
| *G10H 1/00* | (2006.01) | |
| *G09B 19/00* | (2006.01) | |
| *H04R 5/02* | (2006.01) | |
| *H04R 3/12* | (2006.01) | |
| *H04R 5/04* | (2006.01) | |

(52) U.S. Cl.
CPC ........ *G09B 19/0038* (2013.01); *G09B 21/009* (2013.01); *G10H 1/0066* (2013.01); *G10H 1/045* (2013.01); *H04R 1/028* (2013.01); *G10H 2210/056* (2013.01); *G10H 2220/321* (2013.01); *H04R 3/12* (2013.01); *H04R 5/02* (2013.01); *H04R 5/04* (2013.01); *H04R 2201/023* (2013.01)

(58) Field of Classification Search
CPC ................. G10H 1/0066; G10H 1/045; G10H 2210/056; G10H 2220/321; H04R 1/028; H04R 3/12; H04R 5/02; H04R 5/04; H04R 2201/023
See application file for complete search history.

(56) References Cited

U.S. PATENT DOCUMENTS

| | | | |
|---|---|---|---|
| 6,106,491 | A | 8/2000 | Gianutsos |
| 6,132,392 | A | 10/2000 | Stone |
| 6,284,962 | B1 | 9/2001 | Gardner et al. |
| 7,035,422 | B1 | 4/2006 | Wiener |
| 7,147,610 | B2 | 12/2006 | Maalouf |
| 7,152,345 | B2 | 12/2006 | Koenig |
| 7,582,066 | B2 | 9/2009 | Shimotori |
| 7,832,124 | B2 | 11/2010 | Blockton |
| 8,144,911 | B2 | 3/2012 | Chiang et al. |
| 8,343,066 | B1 | 1/2013 | Eagleman et al. |
| 8,398,571 | B2 | 3/2013 | Ellin |
| 8,582,789 | B2 | 11/2013 | Cheung et al. |
| 8,764,688 | B1 | 7/2014 | Nauman et al. |
| 8,795,210 | B2 | 8/2014 | Talish et al. |
| 9,336,795 | B1 | 5/2016 | Robertson et al. |
| 9,452,101 | B2 | 9/2016 | Tomlinson et al. |
| 9,679,546 | B2 | 6/2017 | Ebeling et al. |
| 9,786,201 | B2 | 10/2017 | Ebeling et al. |
| 10,016,615 | B2 | 7/2018 | Simon et al. |
| 10,022,511 | B2 | 7/2018 | Avni |
| 10,071,015 | B2 | 9/2018 | Seo et al. |
| 10,159,623 | B2 | 12/2018 | Leftly |
| 10,172,762 | B1 | 1/2019 | Branch et al. |
| 10,182,964 | B2 | 1/2019 | Snow |
| 10,245,208 | B2 | 4/2019 | Macguinness |
| 10,362,830 | B2 | 7/2019 | Campbell |
| 10,617,597 | B2 | 4/2020 | Chawan et al. |
| 10,624,811 | B2 | 4/2020 | Mackey-Ponte |
| 10,632,040 | B2 | 4/2020 | Muench et al. |
| 10,695,263 | B2 | 6/2020 | Snow |
| 10,828,504 | B2 | 11/2020 | Blendermann |
| 10,905,628 | B2 | 2/2021 | Hodges |
| 10,925,803 | B2 | 2/2021 | Lattner |
| 10,964,179 | B2 | 3/2021 | Ebeling et al. |
| 11,026,824 | B2 | 6/2021 | Burnett et al. |
| 11,065,174 | B2 | 7/2021 | Lach et al. |
| 2002/0107556 | A1 | 8/2002 | Mcloul et al. |
| 2002/0169398 | A1 | 11/2002 | Hancock |
| 2003/0144614 | A1 | 7/2003 | Cordo |
| 2003/0206642 | A1 | 11/2003 | Menzies |
| 2005/0020945 | A1 | 1/2005 | Tosaya et al. |
| 2005/0113167 | A1 | 5/2005 | Buchner et al. |
| 2006/0183964 | A1 | 8/2006 | Kehoe |
| 2007/0100262 | A1 | 5/2007 | Simos et al. |
| 2007/0203435 | A1 | 8/2007 | Novak |
| 2008/0027363 | A1 | 1/2008 | Brueckmann et al. |
| 2008/0143080 | A1 | 6/2008 | Burr |
| 2009/0005713 | A1 | 1/2009 | Podrazhansky et al. |
| 2009/0024183 | A1* | 1/2009 | Fitchmun ............ A61N 1/36038 607/57 |
| 2009/0131165 | A1 | 5/2009 | Buchner et al. |
| 2009/0262967 | A1 | 10/2009 | Bryan |
| 2009/0270758 | A1 | 10/2009 | Eagleman et al. |
| 2010/0174217 | A1 | 7/2010 | Budnik et al. |
| 2010/0249637 | A1 | 9/2010 | Walter et al. |
| 2011/0021272 | A1* | 1/2011 | Grant ...................... G08B 6/00 463/30 |
| 2011/0040204 | A1 | 2/2011 | Ivorra et al. |
| 2011/0046687 | A1 | 2/2011 | Naschberger |
| 2011/0319796 | A1 | 12/2011 | Campdera |
| 2012/0059294 | A1 | 3/2012 | Schubert et al. |
| 2012/0130154 | A1 | 5/2012 | Sajan et al. |
| 2012/0238923 | A1 | 9/2012 | Yamashita et al. |
| 2012/0253236 | A1 | 10/2012 | Snow et al. |
| 2012/0260789 | A1* | 10/2012 | Ur ...................... G09B 19/0015 84/470 R |
| 2013/0116606 | A1 | 5/2013 | Cordo |
| 2013/0204169 | A1 | 8/2013 | Poepperling et al. |
| 2013/0335209 | A1* | 12/2013 | Cruz-Hernandez ...... G08B 6/00 340/407.1 |
| 2014/0005579 | A1 | 1/2014 | Drlik et al. |
| 2014/0012167 | A1 | 1/2014 | Devlieger et al. |
| 2014/0070957 | A1 | 3/2014 | Longinotti-Buitoni et al. |
| 2014/0100488 | A1 | 4/2014 | Simmons |
| 2014/0207033 | A1 | 7/2014 | Hillila |
| 2014/0276271 | A1 | 9/2014 | Stryker et al. |
| 2014/0318699 | A1 | 10/2014 | Longinotti-Buitoni et al. |
| 2015/0013111 | A1 | 1/2015 | White |
| 2015/0062959 | A1 | 3/2015 | Wilson |
| 2015/0097719 | A1 | 4/2015 | Balachandreswaran et al. |
| 2015/0119769 | A1 | 4/2015 | Golbin et al. |
| 2015/0161908 | A1 | 6/2015 | Ur et al. |
| 2015/0177939 | A1 | 6/2015 | Anderson et al. |
| 2015/0217121 | A1 | 8/2015 | Subramanian et al. |
| 2015/0224019 | A1 | 8/2015 | Barbera |
| 2015/0258302 | A1 | 9/2015 | Chandra et al. |
| 2015/0272815 | A1 | 10/2015 | Kitchens |
| 2015/0289034 | A1 | 10/2015 | Engman et al. |
| 2015/0290074 | A1 | 10/2015 | Koenig |
| 2015/0293590 | A1 | 10/2015 | Lehtiniemi et al. |
| 2015/0297445 | A1 | 10/2015 | Gordon et al. |
| 2015/0317910 | A1 | 11/2015 | Daniels |
| 2015/0324646 | A1 | 11/2015 | Kimia |
| 2015/0331488 | A1 | 11/2015 | Grant et al. |
| 2015/0332659 | A1 | 11/2015 | Ebeling et al. |
| 2015/0356889 | A1 | 12/2015 | Schwartz |
| 2015/0366504 | A1 | 12/2015 | Connor |
| 2016/0012688 | A1 | 1/2016 | Eagleman et al. |
| 2016/0027338 | A1 | 1/2016 | Ebeling et al. |
| 2016/0030854 | A1 | 2/2016 | Shaanti |
| 2016/0129248 | A1 | 5/2016 | Creasey et al. |
| 2016/0133151 | A1 | 5/2016 | O'Dowd et al. |
| 2016/0166930 | A1* | 6/2016 | Brav ...................... G08B 21/02 463/30 |
| 2016/0228325 | A1 | 8/2016 | Kologrivov et al. |
| 2017/0079875 | A1 | 3/2017 | Qiao |
| 2017/0098350 | A1 | 4/2017 | Ebeling et al. |
| 2017/0119620 | A1 | 5/2017 | Trapp |
| 2017/0326024 | A1 | 11/2017 | Hernandez |
| 2017/0326025 | A1 | 11/2017 | Hernandez |
| 2018/0140503 | A1 | 5/2018 | Kim et al. |
| 2018/0356890 | A1 | 12/2018 | Zhang et al. |
| 2018/0369064 | A1 | 12/2018 | Baxter et al. |
| 2019/0046794 | A1 | 2/2019 | Goodall et al. |

(56) References Cited

U.S. PATENT DOCUMENTS

| | | |
|---|---|---|
| 2019/0053968 A1 | 2/2019 | Vergara et al. |
| 2019/0070057 A1 | 3/2019 | Conner et al. |
| 2019/0151190 A1 | 5/2019 | Burbank et al. |
| 2019/0151604 A1 | 5/2019 | Harper et al. |
| 2019/0159953 A1 | 5/2019 | Konczak et al. |
| 2019/0175895 A1 | 6/2019 | Uryash et al. |
| 2019/0183724 A1 | 6/2019 | Sifferlin |
| 2019/0298605 A1 | 10/2019 | Rabolt et al. |
| 2019/0328610 A1 | 10/2019 | Qiao |
| 2020/0171267 A1 | 6/2020 | Millard et al. |
| 2020/0188210 A1 | 6/2020 | Molina Trejo |
| 2020/0268602 A1 | 8/2020 | Akaikine et al. |
| 2020/0297067 A1 | 9/2020 | Graham |
| 2020/0323729 A1 | 10/2020 | Arazi et al. |
| 2020/0345970 A1 | 11/2020 | La Rovere et al. |
| 2021/0060287 A1 | 3/2021 | Giacomini et al. |
| 2021/0060330 A1 | 3/2021 | Chu et al. |
| 2021/0077343 A1 | 3/2021 | Baxter et al. |
| 2021/0186801 A1 | 6/2021 | Thomas et al. |
| 2021/0186803 A1 | 6/2021 | Dimino |
| 2021/0213216 A1 | 7/2021 | Smith et al. |
| 2021/0244316 A1 | 8/2021 | Khaled |
| 2021/0251844 A1 | 8/2021 | Radovic |
| 2021/0251848 A1 | 8/2021 | Tracey et al. |
| 2021/0259579 A1 | 8/2021 | Grant-Beuttler et al. |
| 2021/0259911 A1 | 8/2021 | Earsley |
| 2021/0259914 A1 | 8/2021 | Holbert |
| 2021/0275390 A1 | 9/2021 | Hsueh et al. |
| 2021/0290482 A1 | 9/2021 | Wang et al. |
| 2021/0330547 A1 | 10/2021 | Moaddeb et al. |
| 2021/0338413 A1 | 11/2021 | Haluska et al. |

FOREIGN PATENT DOCUMENTS

| | | |
|---|---|---|
| CN | 207745244 U | 8/2018 |
| CN | 111150635 A | 5/2020 |
| CN | 211095931 U | 7/2020 |
| CN | 212662235 U | 3/2021 |
| CN | 112891183 A | 6/2021 |
| CN | 113143734 A | 7/2021 |
| CN | 213697860 U | 7/2021 |
| DE | 102013111050 B4 | 5/2019 |
| GB | 251559 A | 5/1926 |
| GB | 2515599 A | 12/2014 |
| JP | 2020049179 A | 4/2020 |
| KR | 20180036374 A | 4/2018 |
| KR | 20180036379 A | 4/2018 |
| KR | 20180116653 A | 10/2018 |
| KR | 102047655 B1 | 11/2019 |
| KR | 20200102023 A | 8/2020 |
| KR | 102175232 B1 | 11/2020 |
| KR | 20210079124 A | 6/2021 |
| KR | 20210126424 A | 10/2021 |
| WO | 9846189 A1 | 10/1998 |
| WO | 2004080528 A2 | 9/2004 |
| WO | 2006110545 A2 | 10/2006 |
| WO | 2006130559 A2 | 12/2006 |
| WO | 2006134999 A1 | 12/2006 |
| WO | 2009044400 A2 | 4/2009 |
| WO | 2010033086 A1 | 3/2010 |
| WO | 2017017681 A2 | 2/2017 |
| WO | 2017063071 A1 | 4/2017 |
| WO | 2019023467 A1 | 1/2019 |
| WO | 2020123789 A1 | 6/2020 |
| WO | 2020185601 A1 | 9/2020 |
| WO | 2020186274 A1 | 9/2020 |
| WO | 2021042976 A1 | 3/2021 |
| WO | 2021081189 A1 | 4/2021 |
| WO | 2021112922 A1 | 6/2021 |

OTHER PUBLICATIONS

Papetii, S. et al.; "Multi-point vibrotactile feedback. for an expressive musical interface"; Proceedings of the International Conference on New Interfaces for Musical Expression; May 31-Jun. 3, 2015; pp. 235-240; Baton Rouge, LA, USA.

Ridden, Paul; "Review:The Woojer wearable woofer"; New Atlas; Nov. 13, 2014; downloaded on Dec. 17, 2015 from http://newatlas.com/woojer-review/34750/.

Russo, F. A. et al.; "Vibrotactile Discrimination of Musical Timbre"; J Exp Psychol Hum Percept Perform; 2012; pp. 822-826; vol. 38 No 4.

Saba, M. P. et al.; "Hey yaa: a Haptic Warning Wearable to Support Deaf People Communication"; Collaboration and technology; 2011; pp. 215-223; vol. 6969.

Satoshi Morita; "Sonic art for intersensory listening experience"; Proceedings of the Electroacoustic Music Studies Network Conference, Electroacoustic Music Beyond Performance; Jun. 2014; pp. 1-11; Berlin, Germany.

Saul Mate-Cid; "Vibrotactile Perception of Musical Pitch"; Thesis submitted in accordance with the requirements of the University of Liverpool for the degree of Doctor of Phylosophy, Acoustic Research Unit, School of Architecture; Dec. 2013: pp. 216.

Shaffer, F.; "A healthy heart is not a metronome: an integrative review of the heart's anatomy and heart rate variability" Front Psychol; Sep. 30, 2014; pp. 1-19; vol. 5; Article 1040; Switzerland.

Speaker allows deaf to feel music. Story from BBC News; Oct. 26, 2015; downloaded Dec. 17, 2015 from http://news.bbc.co.uk/go/pr/fr/-12/hi/uk _ news/england/london/4377 428.stm.

Sujata Gupta; "Music for your Skin"; Jul. 9, 2014; NOVA Next; downloaded from http://www.pbs.org/wgbh/nova/next/body/haptic-hearing/.

Terdiman, Daniel; "Beat it! New wearable device for musicians is like a sexy, wearable metronome"; VB; Mar. 31, 2015; downloaded on Dec. 17, 2015 from https://venturebeat.com.

The Soundbeam Project Ltd; "Vibroacoustic products"; 2002; Bristol UK; downloaded Dec. 18, 2015 from http://www.soundbeam.eo.uk/vibroacoustics/.

The, Y.H.; "Experiments on the Audio Frequency Response of Shape Memory Alloy Actuators"; Jan. 2005.

Treuhaft, Teshia; "Feel the Beat: Soundbrenner creates the First Wearable Device for Musicians"; Core77; Apr. 3, 2015; downloaded on Dec. 17, 2015 from http://www.core77.com.

Van Der Linden, J. et al.; "MusicJacket—Combining Motion Capture and Vibrotactile Feedback to Teach Violin Bowing"; IEEE T Instrum Meas; Jan. 2011; pp. 1-10; vol. 60; Issue: 1.

Woojer, the Wearable Audio Accessory That Lets You Feel the Sound; Wearable Tech; Nov. 31, 2013; downloaded on May 15, 2015 from http://www.wearabletechworld.com.

Yao, L. et al.: "Music-touch shoes: vibrotactile interface for hearing impaired dancers." Proceedings of the 4th International Conference on Tangible and Embedded Interaction 2010; Jan. 24-27, 2010; pp. 275-276; Cambridge, MA, USA.

Yi Yang; "Design and Control of an Integrated Haptic Interface for Touch Screen Applications"; Thesis presented in the application to obtain the Doctorate degree in Science of the University of Lille; Nov. 2013; pp. 185; France.

Yong, G. et aL; "Audio-Tactile Glove"; Proc. of the 16th Int. Conference on Digital Audio Effects (DAFx-13): Sep. 2-5, 2013; pp. 1-5; Maynooth, Ireland.

Yong, Gareth; "Sound and Music Computing Conference"; wordpress.com; Jul. 13, 2015; downloaded on Dec. 18, 2015 from https://garethyoung.org/2015/07/13/sound-and-music-computing-conference/.

Zoe Cormier; "The good vibrations helping the deaf experience music"; wired.co.uk; Nov. 30, 2014 downloaded on Dec. 17, 2015 from http://www.wired.eo.uk/article/good-vibes-for-the-deaf.

"Buttkicker Gamer2 for Simulation and Gaming"; The Guitammer Company; 2011; downloaded on May 15, 2015 from http://www.thebuttkicker.com/gaming/.

Haptic Gaming SDK: Haptic Effects Library / UHL (Universal Haptic Layer); Immersion Corporation; 2015; downloaded on Dec. 18, 2015 from https://www.immersion.com.

"Woojer—FEEL the Sound!"; Kickstarter, Inc. Manhattan, NY; Dec. 2013; downloaded on Dec. 17, 2015 from https://www.kickstarter.com/projects/1382889335/woojer-feel-the-sound.

(56) References Cited

OTHER PUBLICATIONS

Abstract of Branje, C. et al.: "Playing vibrotactile music: A comparison between the Vibrochord and a piano keyboard"; Int J Hum-Comput St; Apr. 2014; pp. 431-439; vol. 72 Issue 4.

Abstract of Darrow, A.A. et al.; "The Effect of Vibrotactile Stimuli via the SOMATRON™ on the Identification of Rhythmic Concepts by Hearing Impaired Children"; J Music Ther; 1989; pp. 115-124; vol. 26 No.3.

Abstract of Darrow, A.A.; "The Effect of Frequency Adjustment on the Vocal Reproduction Accuracy of Hearing Impaired Children": J Music Ther; 1990; pp. 24-33; vol. 27 No.1.

Abstract of Darrow, A.A; "The Effect of Vibrotactile Stimuli via the SOMATRON on the Identification of Pitch Change by Hearing Impaired Children"; J Music Ther; 1992; pp. 103-112; vol. 29 No.2.

Abstract of Gu, C. et al.; "Vibrotactile thresholds at the sole of the foot: effect of vibration frequency and contact location"; Somatosens Mot Res; Nov. 25, 2011; pp. 86-93; vol. 28 No. 3-4.

Abstract of Hayes, L. et al.; "Imposing a Networked Vibrotactile Communication System for Improvisational Suggestion"; Organized Sound; Apr. 2012; pp. 36-44; vol. 17, Issue 1.

Abstract of Ideguchi, T. et al.; "Influence of the Sensation of Vibration on Perception and Sensibility while Listening to Music"; Int J Innov Comput I; Mar. 2009; pp. 631-640; vol. 5 No. 5.

Alan Cross; "This is New: Vibrotactile Music"; A Journal of Musical Things; Jun. 20, 2012; downloaded Dec. 18, 2015 from http://ajournalofmusicalthings.com/this-is-new-vibrotactile-music/.

Beaufait, M. et al.; "Soundless Music"; Electrical and Computer Engineering University of Michigan, EECS 452: Digital Signal Processing Design Laboratory; Winter 2012; accessed Dec. 17, 2015 from http://www.eecs.umich.edu.

Birnbaum, D. et al.; "A Systematic Approach to Musical Vibrotactile Feedback"; International Computer Music Association; 2007; pp. 397-404; vol. 2007.

Bobier, David; "VibraFusionLab"; VibraFusionLab; 2015; downloaded on Dec. 18, 2015 from http:/www.vibrafusionlab.com/.

Carmen Branje; "Feeling the Music: Vibrotactile music is the latest example of technology enabling the emergence of new art forms."; Jul. 15, 2011.

Chafe, C.; "Tactile Audio Feedback"; Proc. Intl. Computer Music Conf.; Sep. 1993: pp. 76-79; Tokio, Japan.

Choi, S. et al.; "Vibrotactile Display: Perception, Technology, and Applications"; Proc. IEEE; Sep. 2013; pp. 2093-2104; vol. 101, No. 9.

Copper, R; "Beethoven, Music and The Deaf: A Brief Consideration of the Works and Struggles of Ludwig Van Beethoven"; Lifeprint.com; May 14, 2007; USA; downloaded Dec. 17, 2015 from http://www. lifeprint.com/asl101/topics/beethoven02. htm.

D. Richards Ternes; "Building Large Set of Haptic Icons: rhythm as a design parameter, and between-subjects MDS for evaluation"; Thesis submitted Aug. 2007; pp. 1-263; The University of British Columbia; Canada.

Dr. Stefano Papetti; "AHMI Audio-Haptic modalities in Musical Interfaces": Institute for Computer Music and Sound Technology; Mar. 1, 2014; Zurich, Switzerland; downloaded Dec. 18, 2015 from https://www.zhdk.ch/index.php?id=icst_ahmi_ e.

Emanuele. Mahzoun; "Good Vibrations: A vibrotactile aid toward music sensation aiming at helping deaf people"; Thesis presented as part of Degree of Master of Science In Electrical Engineering with emphasis on Signal Processing BTH; May 2013; pp. 61.

Eric Gunther; "Skinscape: A Tool for Composition in the Tactile Modality"; Thesis Submitted to the Deparlment of Electrical Engineering and Computer Science MIT; May 23, 2001; pp. 118.

Fontana, F. et al.; "Perception of Interactive Vibrotactile Cues on the Acoustic Grand and Upright Piano" Proceedings ICMC SMC 2014, Sep. 14-20, 2014; pp. 948-953; Athens, Greece.

Giordano et al.; "Perceptual and Technological Issues in the Design of Vibrotactile Augmented Interfaces for Music Technology and Media": Haptic and Audio Interaction Design; vol. 7989, Lecture Notes in Computer Science; pp. 89-98; HAID 2013, LNCS 7989.

Good, A.; "Compensatory Plasticity in the Deaf Brain: Effects on Perception of Music"; 2014; Brain Sci; pp. 560-574; vol. 4.

Gunther, E. et al. "Cutaneous Grooves: Composing for the Sense of Touch"; Journal of New Music Research; 2002; pp. 1-13; vol. 31 No. 1.

Hakon Knutzen; "Haptics in the Air—Exploring Vibrotactile Feedback for Digital Musical Instruments with Open Air Controllers"; Department of Musicology University of Oslo; Oct. 2013; pp. 1-106; Oslo Notway.

Hoggan, E. et al.; "Audio or tactile feedback: which modality when?"; CHI'09 Proceedings of the SIGCHI Conference on Human Factors in Computing Systems; Apr. 9, 2009; pp. 2253-2256; New York, NY, USA.

Inwook Hwang; "Perceptual Analysis of Vibrotactile Stimuli and Its Application to Vibrotactile Rendering of Music"; Department of Computer Science and Engineering Pohang University of Science and Technology; Jun. 24, 2013; pp. 1-116; Pohang, South Korea.

Israr, A. et al.; "Tactile Brush: Drawing on Skin with a Tactile Grid Display"; CHI 2011 • Session: Touch 1: Tactile & Haptics; May 7-12, 2011; pp. 2019-2028; Vancouver, BC, Canada.

Jack Loftus; "Music for Deaf People Headphones Produce "Sound" Through Synesthesia"; GIZMODO; May 5, 2010; downloaded Dec. 17, 2015 from http://gizmodo.com/5551200/music-for-deaf-people-headphones-produce-sound-through-synesthesia.

Jack. R. et al.; "Designing Tactile Musical Devices with and for Deaf Users: a Case Study"; Proceedings of the International Conference on the Multimodal Experience of Music 2015; Mar. 23-25, 2015; pp. 001-007; University of Sheffield, UK.

Jacob Siegal; "Good Vibrations: A Musical Glove That Improves Motor Skills"; PCWorld; Jul. 17, 2012; downloaded Dec. 17, 2015 from http://www.pcworld.com.

Kalan, J; "Why have so few innovations for deaf people actually made it to market?. . ."; BBC Future: Jul. 31, 2013; downloaded Dec. 17, 2015, http://v11ww.bbc.com/future/story/20130731-helping-the—deaf-to-see-sound.

Karam, M.; "Designing and Experiencing Audio-Tactile Displays"; eTELEMED 2010; Feb. 10-16, 2010; St Maarten, Netherlands Antilles; downloaded Dec. 18, 2015 from http://www.iaria.org/conferences2010/fileseTELEMED10/AudioTactileDisplays.pdf.

Kirn, Peter; "On Apple Watch, Sound Design Translates into Haptic Feel"; cdm; Apr. 7, 2015; downloaded on Dec. 18, 2015 from http://cdm.link/2015/04/apple-watch-sound-design-translates-haptic-feel/.

Lasane, Andrew; "This Futuristic Headband Vibrates Music Through Your Skull"; mental_floss; 2015; downloaded on Dec. 17, 2015 from http://mentalfloss.com/article/68760/futuristic-headband-vibrates-music-through-your-skull.

Lauren Sarah Hayes; "Skin Music: an audio-haptic composition"; Cycling '74: Tools for Sound, Graphics, and Interactivity Project #1065; 2012; Edinburg, Scotland; downloaded Dec. 18, 2015 from https://cycling74.com.

Lee, K. "Mouth-Mounted MP3 Player lets You Hear Beats Through Your Teeth"; PCWorld; Jun. 1, 2012; downloaded Dec. 17, 2015 from http://www.techhive.com/article/256652/ mouth _ mounted _ mp3 _player _Jets_ _you _hear_ beats_Jhrough_ _your_Jeeth.html.

Malloch, Joseph; "Vibrotactile feedback for the T-Stick DMI"; wordpress.com; Feb. 6, 2008; downloaded on Dec. 18, 2015 from https://josephmalloch.word press.com/2008/02/06/vibrotactile-feed back-for-the-t-stick-d mi/.

Manresa-Yee, C.; "A Vibrotactile Interface to Motivate Movement for Children with Severe to Profound Disabilities" Proceedings of the XV International Conference on Human Computer Interaction 2014; pp. 69-72; downloaded on Dec. 18, 2015 from vbn.aau.dk.

Mario Enriquez: "A Study of Haptic Icons"; The Faculty of Graduate Studies Department of Computer Science University of British Columbia; Oct. 2002; pp. 1-88; Vancouver, British Columbia, Canada.

Marshall, M.T. et al.; "Vibrotactile Feedback in Digital Musical Instruments"; Proceedings of the 2006 Conference on New Interfaces for Musical Expression; Jan. 2006; pp. 1-4; Paris, France; downloaded Dec. 18, 2015 from http://recherche.iream.fr.

Mat 200C, Spring 2014 downloaded on Dec. 20, 2015 from http://mat200c-2014-tumblr.com/.

(56) References Cited

OTHER PUBLICATIONS

Matt Kramer; "Vibro Acoustic"; Jul. 22, 2009; Orlando Florida; downloaded Dec. 18, 2015 from http://mattkramersoundhealing.com/.

McGuire, J. et al.; "Vibrotactile Device for Optimizing Skin Response to Vibration"; UW-BEM Design; Oct. 26, 2011; pp. 25: Madison, WI; downloaded Mar. 3, 2016 from http://bmedesign.engr.wisc.edu/projects/file/?fid=2148.

Merlo, J.L et al.; "Communicating Through the Use of Vibrotactile Displays for Dismounted and Mounted Soldiers"; 25th Army Science Conference; Nov. 2006; pp. 7; Orlando, FL.

Miga Motor Company; "DM01 Linear Shape Memory Alloy Actuator with Basic Stamp Microcontroller Kit"; Miga Motors; Mar. 1, 2007; downloaded Mar. 29, 2016 from http://www.migamotors.com/Media/DM01-B0E-App-Notes.pdf.

Morley, J.W et al.; "Perceived Pitch of Vibrotactile Stimuli: Effects of Vibration Amplitude, and Implications for Vibration Frequency Coding"; J. Physiol; 1990; pp. 403-416; vol. 431.

Morley, J.W.; "Perceived Pitch of Vibrotactile Stimuli: Effects of Vibration Amplitude, and implications for Vibration Frequency Coding." J. Physiol.; May 9, 1990; pp. 403-416; vol. 431; Great Britain.

Sajan , "A portable phonatory feedback device for patients with speech disorders", (2010). LSU Master's Theses. 2837. pp. 43.

\* cited by examiner

VIBROTACTILE CONTROL SYSTEMS AND METHODS

CROSS-REFERENCE TO RELATED APPLICATIONS

The present application is a continuation of U.S. application Ser. No. 16/881,443, filed May 22, 2020, which is a continuation of U.S. application Ser. No. 15/381,610, filed Dec. 16, 2016, now abandoned, which is a continuation-in-part of U.S. application Ser. No. 14/713,908, filed May 15, 2015, issued as U.S. Pat. No. 9,679,546 on Jun. 13, 2017, which claims the benefit of priority to U.S. Provisional Application No. 61/994,753, filed May 16, 2014, each of which is incorporated by reference herein in its entirety.

TECHNICAL FIELD

The present invention relates to vibrotactile technologies, systems, and subsystems and, more specifically to systems to control vibrations to make it easy to create the sensation of vibrotactile movement on the body of a user. Also, this disclosure relates to a wearable vest designed to enable individuals such as hearing-impaired persons to experience sounds or other stimuli of various kinds, including but not limited to music, alarms, game events, and speech.

BACKGROUND

An aspect of the present disclosure is a system that uses vibratory motors to generate a haptic language for audio (or other stimuli) that is integrated into wearable technology. The inventive "sound vest" is intended as an assistive device for the hearing-impaired in certain embodiments. The disclosed system enables the creation of a family of devices that allow people, such as those with hearing impairments, to experience sounds such as music, or other inputs, to the system. The functionality of vests according to aspects of the present invention could include transforming sound/music/game input to haptic signals so that users can experience their favorite music in a unique way, and also systems that can recognize auditory cues in a user's everyday environment and convey this information to the user using haptic signals. Such pertinent auditory inputs could include a loud siren, someone calling out the user's name, etc.

It is desirable to address the limitations in the art.

BRIEF DESCRIPTION OF THE DRAWINGS

By way of example, reference will now be made to the accompanying drawings, which are not to scale.

DETAILED DESCRIPTION

Figure 1:
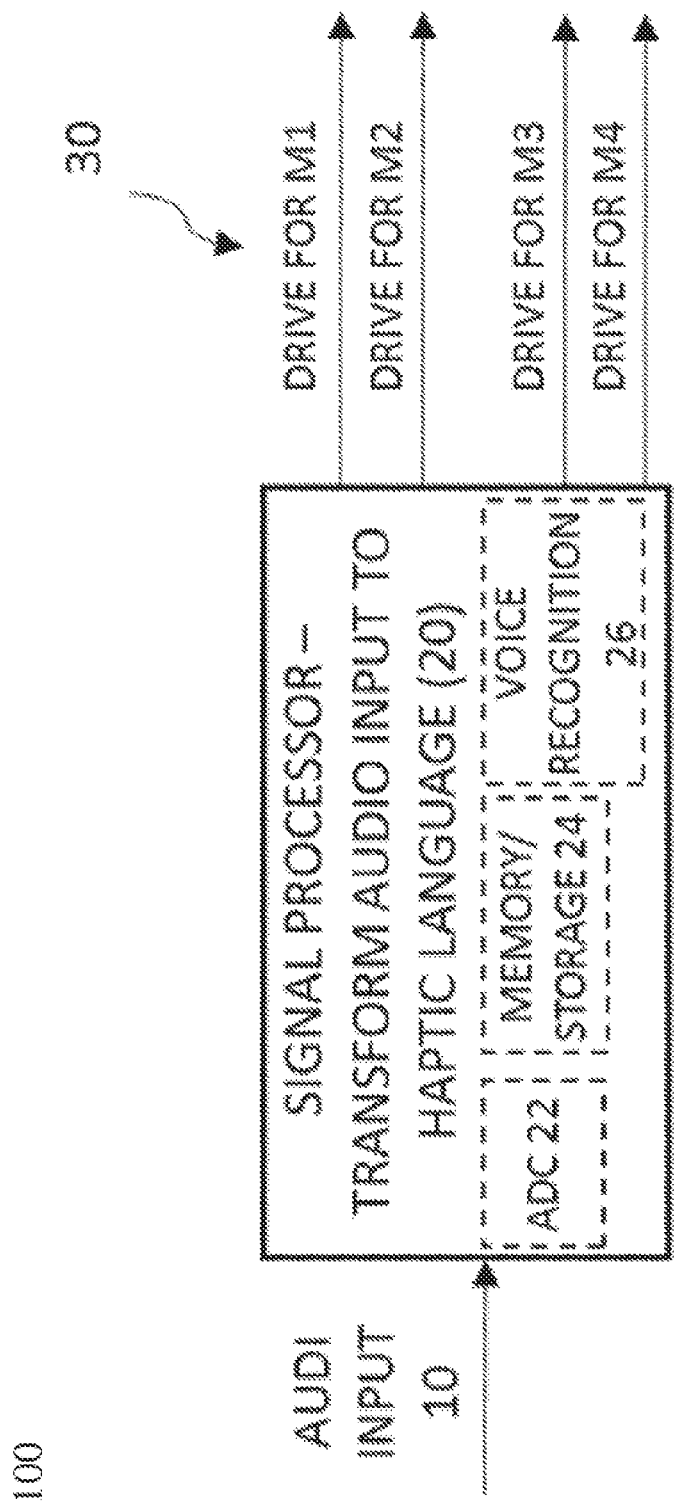
FIG. 1 is a block diagram of an illustrative embodiment.

Those of ordinary skill in the art will realize that the following description of the present invention is illustrative only and not in any way limiting. Other embodiments of the invention will readily suggest themselves to such skilled persons, having the benefit of this disclosure, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Reference will now be made in detail to specific implementations of the present invention as illustrated in the accompanying drawings. The same reference numbers will be used throughout the drawings and the following description to refer to the same or like parts.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

The present disclosure in certain embodiments relates to a system, or "sound vest", that uses vibratory motors to generate a haptic language for music or other sound, or other stimuli, that is integrated into wearable technology. A technical challenge to creating such a system is to design a system that decomposes auditory or other input into control signals that can be streamed out to a network of motors. The present inventors have designed a preliminary system that in certain embodiment performs entry-level signal processing techniques on the incoming sound or other stimuli in order to determine the spectral profile of the input. The motors are then powered based on the magnitude of the spectral power.

A preliminary design of the system in certain embodiments enables the use of up to 64 motors to represent the incoming audio or other stimuli. A revised design in certain embodiments utilizes 64 motors on each of the front and back sides of the vest, for a total of 128 motors. For example, each of M1, M2, M3, and M4 in FIG. 2 could represent up to 16 separate motors, for a total of 64 motors on the front side of the vest 40. A similar network of 64 motors could be deployed on the back side of the vest. The user's entire torso may be utilized to create a tono-topic map of the torso that is, vibratory motors on the left (L) side of the vest may be mapped to the left speaker, vibratory motors on the right (R) side of the vest may be mapped to the right speaker, vibratory motors on the bottom of the vest may be mapped to low frequencies, and vibratory motors on the top of the vest may be mapped to high frequencies.

FIG. 1 depicts the basic system in certain embodiments, including signal processor (20) that receives audio input (10) (e.g., from a microphone (50, see FIG. 2) or audio jack) and transforms the input audio signal into a haptic language for driving (30) a network of motors denoted M1, M2, M3, and M4. The signal processor may also include an analog-to-digital converter (ADC) (22) for digitizing real-time audio signals provided in analog form, memory or storage (24) for storing audio data, executable instructions, and the like; and a voice recognition module (26).

Figure 2:
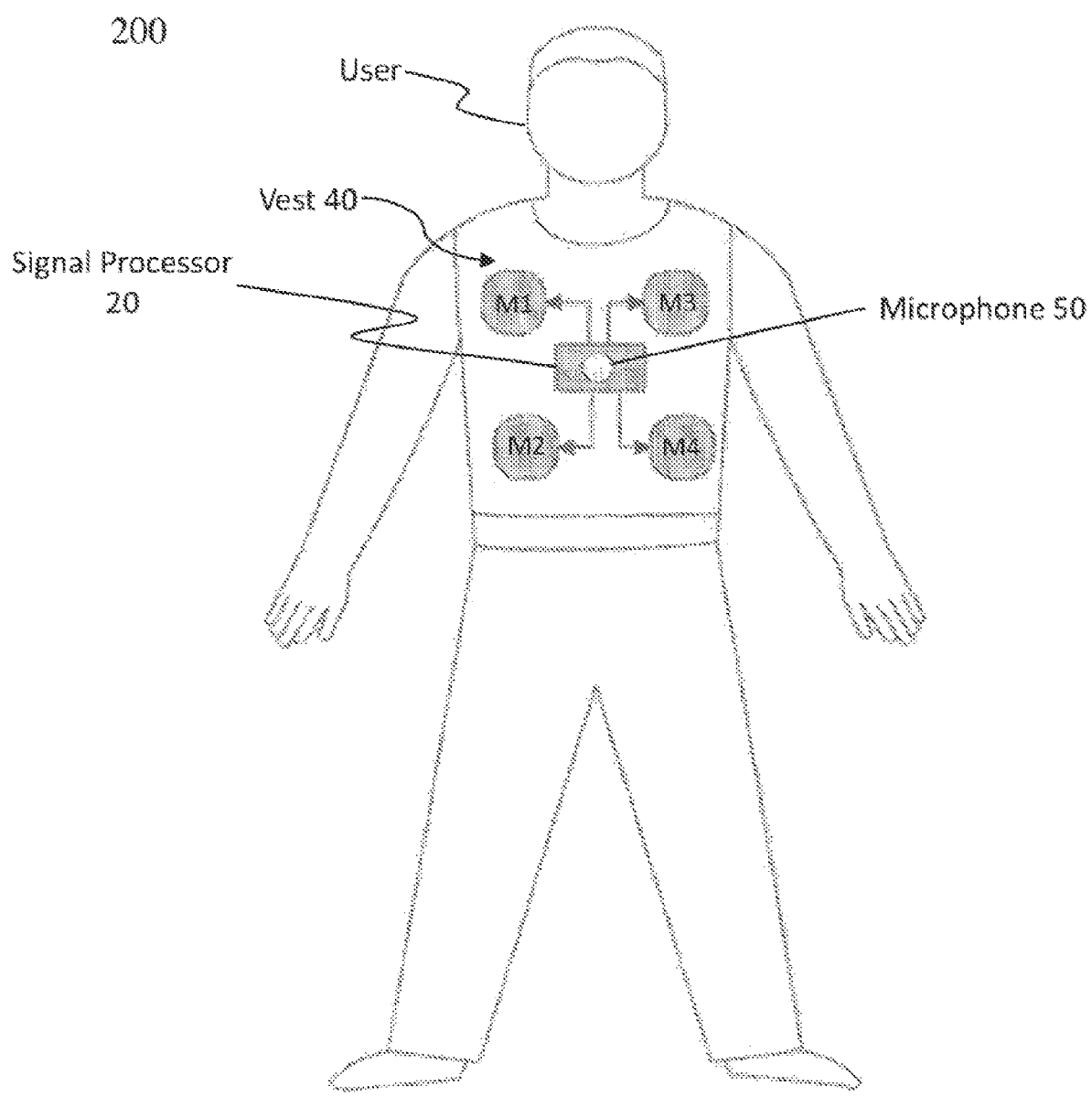
FIG. 2 depicts aspects of certain embodiments of the present invention integrated into a wearable vest.

As shown in FIG. 2, the motors M1 through M4 may be integrated into a wearable vest (40) such that M1 and M2 are on the right side of the user's torso, and M3 and M4 are on the left side of the user's torso. Moreover, motors M1 and M3 may vibrate to represent the higher frequency components of the audio input, whereas motors M2 and M4 may vibrate to represent the lower frequency components. It should be understood that in a commercial implementation, there would likely be many more than four motors in certain embodiments.

Figure 3:
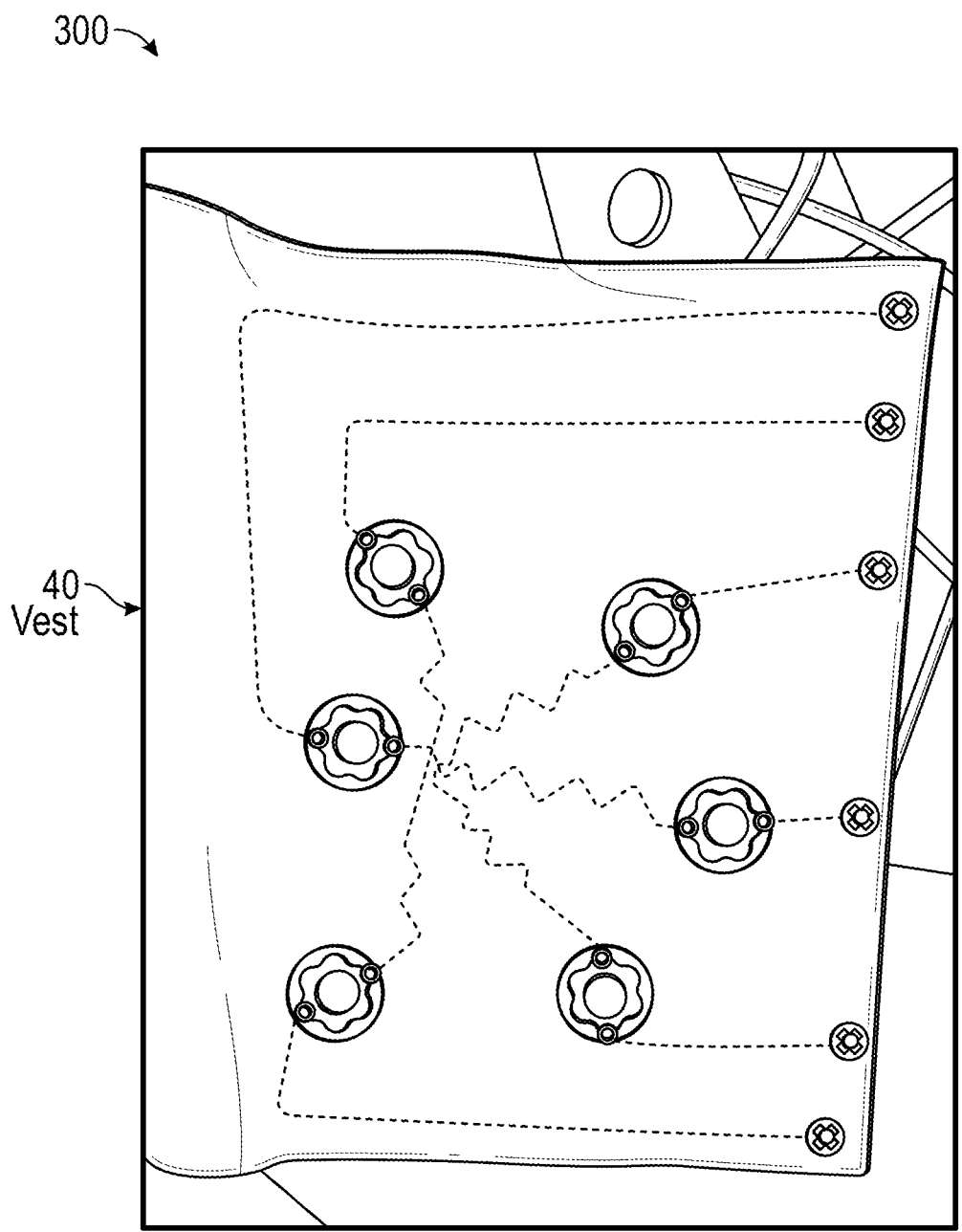
FIG. 3 is a photograph of a prototype in which a network of motors is stitched into a piece of fabric according to aspects of certain embodiments.

As shown in FIG. 3, using conductive thread and relatively low-cost vibratory motors, an initial prototype was made by stitching thread into fabric, as illustrated.

Applicants are aware of information in the public domain relating to wearable technology with haptic feedback. Copies of this information are being submitted in conjunction with this application in Information Disclosure Statements (IDS). Some of the known prior art references translate sound to vibration, but the present disclosure is different in certain embodiments in that it goes beyond a simple sensory substitution. The brain is an amazingly "plastic" organ, and we will take advantage of its plasticity by giving the hearing impaired the opportunity to experience music through a haptic "language." This difference lies in the real-time spectral analysis performed as the music streams into the micro-controller at the heart of the sound vest in certain embodiments—the audio streams in and is broken down to a representation of its basic frequency components. Then, each frequency domain is sent to a different part of the body (i.e., if the user is listening to Alvin and the Chipmunks, he will feel a lot of vibration up by his collarbones, and not much down low; listen to Barry White, and it will be the other way around due to the dominance of Mr. White's low frequency components). The inventive system in certain embodiments can also represent stereo by streaming to the left side of the body for the left speaker and right speaker to the right side.

Further Developments

During the course of further developing the system described above, we have discovered that the process of creating musical sensation though tactile stimuli can be improved in several ways in certain embodiments:

1. The audio signals or other stimuli can be improved by converting them into the MIDI (i.e., Musical Instrument Digital Interface) data format in certain embodiments, and then reducing the data to a small defined number of tracks, e.g., four (4) tracks representing drums, bass, guitars, and vocal. Other selections could be used as well, depending on the type of music. (Those skilled in the art understand that MIDI is a technical standard that enables a wide variety of electronic musical instruments, computers and other related devices to connect and communicate with one another. A single MIDI link can carry up to sixteen channels of information, each of which can be routed to a separate device.)

2. Instead of mapping the audio signals to the motors as described above (i.e., mapping higher frequencies to the top of the vest and mapping the lower frequencies to the bottom of the vest), it may be advantageous in certain embodiments to map each of the 4 tracks to different parts of the vest. For example, the signals corresponding to vocals can be directed to the mid-section while the drums, bass, and guitar signals are directed to respective regions surrounding the mid-section. This mapping has been found to create less crossover and less "muddiness" to the vibrations created by the motors.

3. If the system is unable to convert live audio to MIDI data in real time, it can be advantageous in certain embodiments to provide a mode in which the music data is first downloaded and then played back through the vest. In this way, the user can experience the music, albeit not in a real-time, "live" setting.

Figure 4:
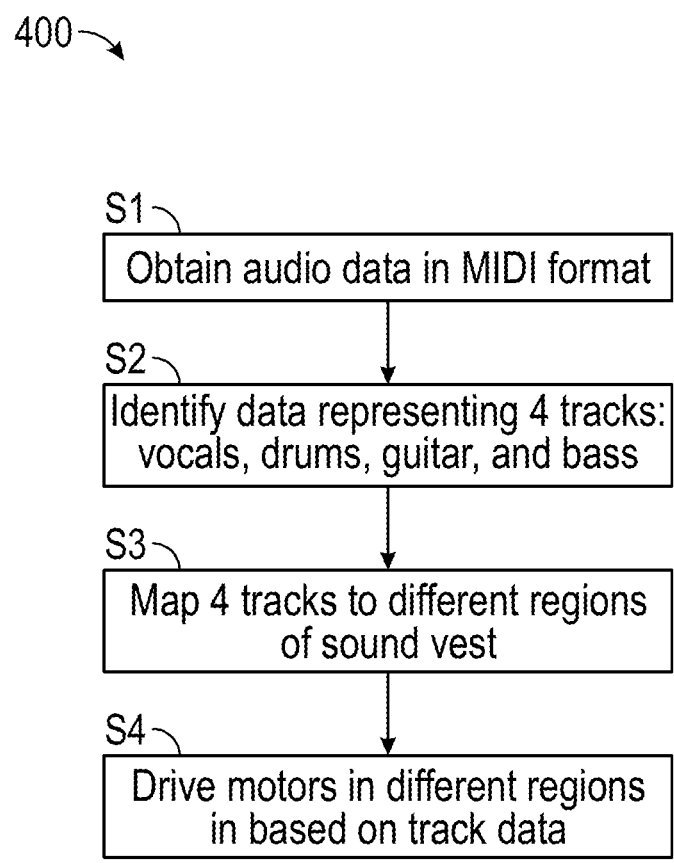
FIG. 4 is a flowchart of an algorithm according to aspects of the present invention in certain embodiments for converting audio data or other stimuli into signals for driving a network of vibrating motors incorporated into a wearable vest.

As shown in FIG. 4, an algorithm for converting audio data or other stimuli into signals for driving a network of vibrating motors incorporated into a wearable vest comprises the following steps in certain embodiments: First, in step S1, audio data in MIDI format is obtained. The data can either be downloaded to the system from a third party provider, or created using recorded audio and an audio production software tool. In step S2, the MIDI data is organized into 4 tracks representing vocals, drums, guitars, and bass. In step S3, the 4 tracks are mapped to different regions of the sound vest; and in step S4 the respective tracks of data are used to drive the motors in the different regions.

The system in certain embodiments may be enhanced by providing wireless links between the signal processor and the motors. In addition, a voice recognition module may be incorporated to enable the system to recognize specific spoken words for selective playback through the motors. For example, the user's name may be specifically recognized and used to signal the user through the motors.

Figure 5:
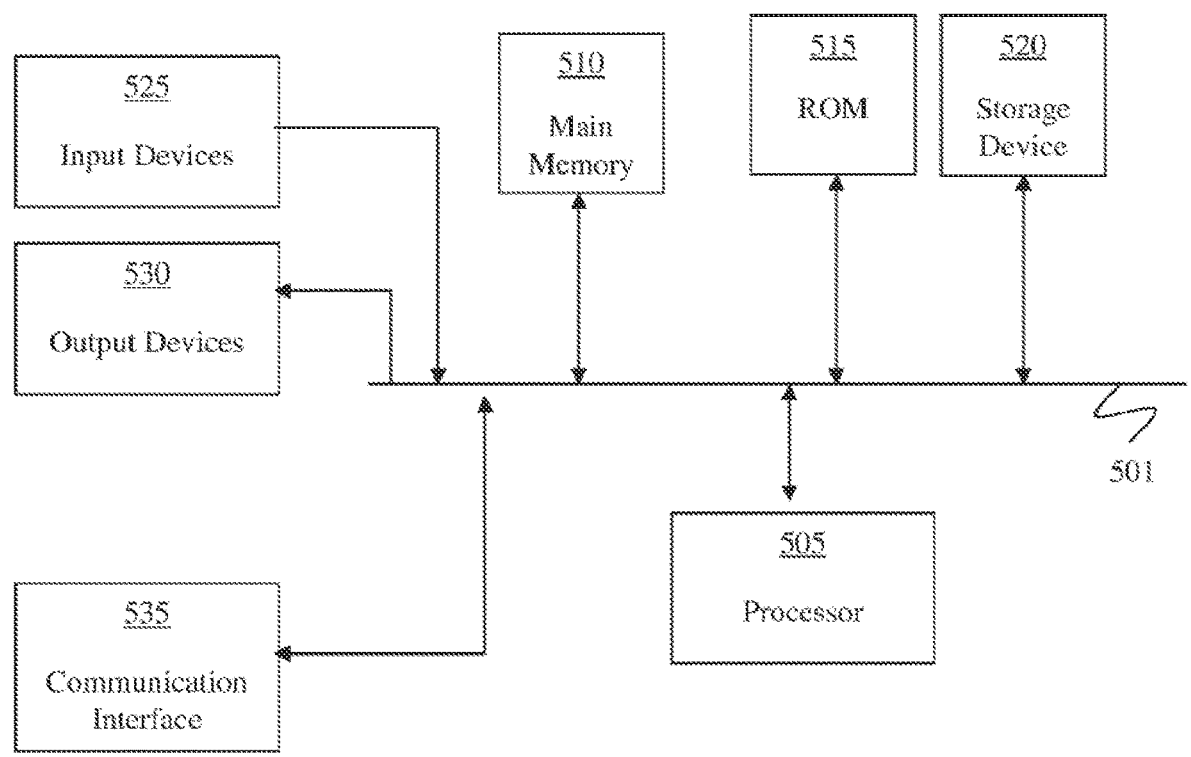
FIG. 5 is an exemplary diagram of a computing device that may be used to implement aspects of certain embodiments of the present invention.

FIG. 5 is an exemplary diagram of a computing device 500 that may be used to implement aspects of certain embodiments of the present invention. Computing device 500 may include a bus 501, one or more processors 505, a main memory 510, a read-only memory (ROM) 515, a storage device 520, one or more input devices 525, one or more output devices 530 (including vibrotactile actuators such as motors, as described herein), and a communication interface 535. Bus 501 may include one or more conductors that permit communication among the components of computing device 500. Processor 505 may include any type of conventional processor, microprocessor, or processing logic that interprets and executes instructions. Main memory 510 may include a random-access memory (RAM) or another type of dynamic storage device that stores information and instructions for execution by processor 505. ROM 515 may include a conventional ROM device or another type of static storage device that stores static information and instructions for use by processor 505. Storage device 520 may include a magnetic and/or optical recording medium and its corresponding drive. Input device(s) 525 may include one or more conventional mechanisms that permit a user to input information to computing device 500, such as a keyboard, a mouse, a pen, a stylus, handwriting recognition, voice recognition, biometric mechanisms, and the like. Output device(s) 130 may include one or more conventional mechanisms that output information to the user, including a display, a projector, an A/V receiver, a printer, a speaker, and the like. Communication interface 535 may include any transceiver-like mechanism that enables computing device/ server 500 to communicate with other devices and/or systems. Computing device 500 may perform operations based on software instructions that may be read into memory 110 from another computer-readable medium, such as data storage device 520, or from another device via communication interface 535. The software instructions contained in memory 510 cause processor 505 to perform processes that will be described later. Alternatively, hard-wired circuitry may be used in place of or in combination with software instructions to implement processes consistent with the present invention. Thus, various implementations are not limited to any specific combination of hardware circuitry and software.

In certain embodiments, memory 510 may include without limitation high-speed random access memory, such as DRAM, SRAM, DDR RAM or other random access solid state memory devices; and may include without limitation non-volatile memory, such as one or more magnetic disk storage devices, optical disk storage devices, flash memory devices, or other non-volatile solid state storage devices. Memory 510 may optionally include one or more storage devices remotely located from the processor(s) 505. Memory 510, or one or more of the storage devices (e.g., one or more non-volatile storage devices) in memory 510, may include a computer readable storage medium. In certain embodiments, memory 510 or the computer readable storage medium of memory 510 may store one or more of the following programs, modules and data structures: an operating system that includes procedures for handling various basic system services and for performing hardware dependent tasks; a network communication module that is used for connecting computing device 510 to other computers via the one or more communication network interfaces and one or more communication networks, such as the Internet, other wide area networks, local area networks, metropolitan area networks, and so on; a client application that may permit a user to interact with computing device 500.

Certain text and/or figures in this specification may refer to or describe flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions that execute on the computer or other programmable apparatus create structures for implementing the functions specified in the flow chart block or blocks. These computer program instructions may also be stored in computer-readable memory that can direct a computer or other programmable apparatus to function in a particular manner, such that the instructions stored in computer-readable memory produce an article of manufacture including instruction structures that implement the function specified in the flow chart block or blocks. The computer program instructions may also be loaded onto a computer or other programmable apparatus to cause a series of operational steps to be performed on the computer or other programmable apparatus to produce a computer-implemented process such that the instructions that execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems that perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

In the descriptions set forth herein, certain embodiments are described in terms of particular data structures, preferred and optional enforcements, preferred control flows, and examples. Other and further application of the described methods, as would be understood after review of this application by those with ordinary skill in the art, are within the scope of the invention. The term "machine-readable medium" should be understood to include any structure that participates in providing data that may be read by an element of a computer system. Such a medium may take many forms, including but not limited to, non-volatile media, volatile media, and transmission media. Non-volatile media include, for example, optical or magnetic disks and other persistent memory such as devices based on flash memory (such as solid-state drives, or SSDs). Volatile media include dynamic random access memory (DRAM) and/or static random access memory (SRAM). Transmission media include cables, wires, and fibers, including the wires that comprise a system bus coupled to a processor. Common forms of machine-readable media include, for example and without limitation, a floppy disk, a flexible disk, a hard disk, a solid-state drive, a magnetic tape, any other magnetic medium, a CD-ROM, a DVD, or any other optical medium.

Figure 6:
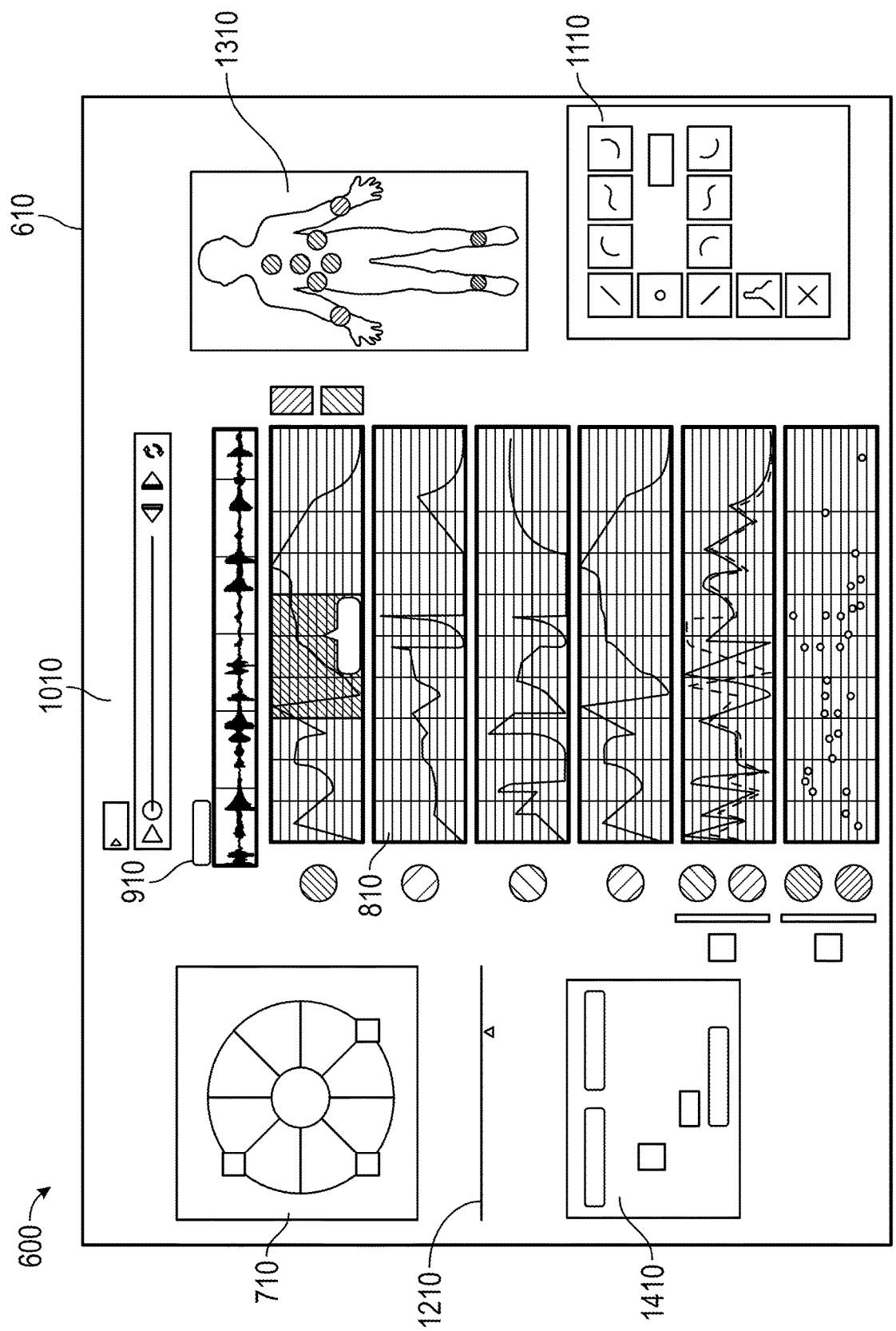
FIG. 6 is an exemplary diagram of a main display of the vibrotactile control system VCS in any given computing device that may be used to implement aspects of certain embodiments of the present invention.

FIG. 6 is a grayscale version of an exemplary embodiment of a main view display 600, also called the vibrotactile control system VCS 610 herein. In the embodiment of FIG. 6, each section of the system represents different components of the main display that may serve to craft the vibrations that are coupled to a sound file. In certain embodiments of this invention, the sound file could comprise prerecorded sound or a live system. In both cases, the intention would be to replicate the vibrations of live instruments or sounds being play in real time.

The main view display 610 may facilitate understanding and interaction with the system in certain embodiments, and may be used to create an intuitive experience with little or no stiff learning curve, allowing the user to easily adopt the technology.

In the example of the main view display 610 shown in FIG. 6, starting from the top left corner, the embodiment of the present invention may include a movement wheel 710, a Brownian grain display 1210, and a file export display 1410. In the center, from top to bottom it may also include a play/record bar 1010, a wave sound representation 910, which may be a standard audio file representation, and a timeline chart 810. Finally, on the left portion of the main view display 610, an embodiment may show a vibrotactile body display 1310 and a tool selector 1110.

Embodiments of the present invention may be used to implement aspects that will create a surround body experience, in which the vibrotactile creator can craft and control vibrations to any part of the body at any given point in time.

Figure 7:
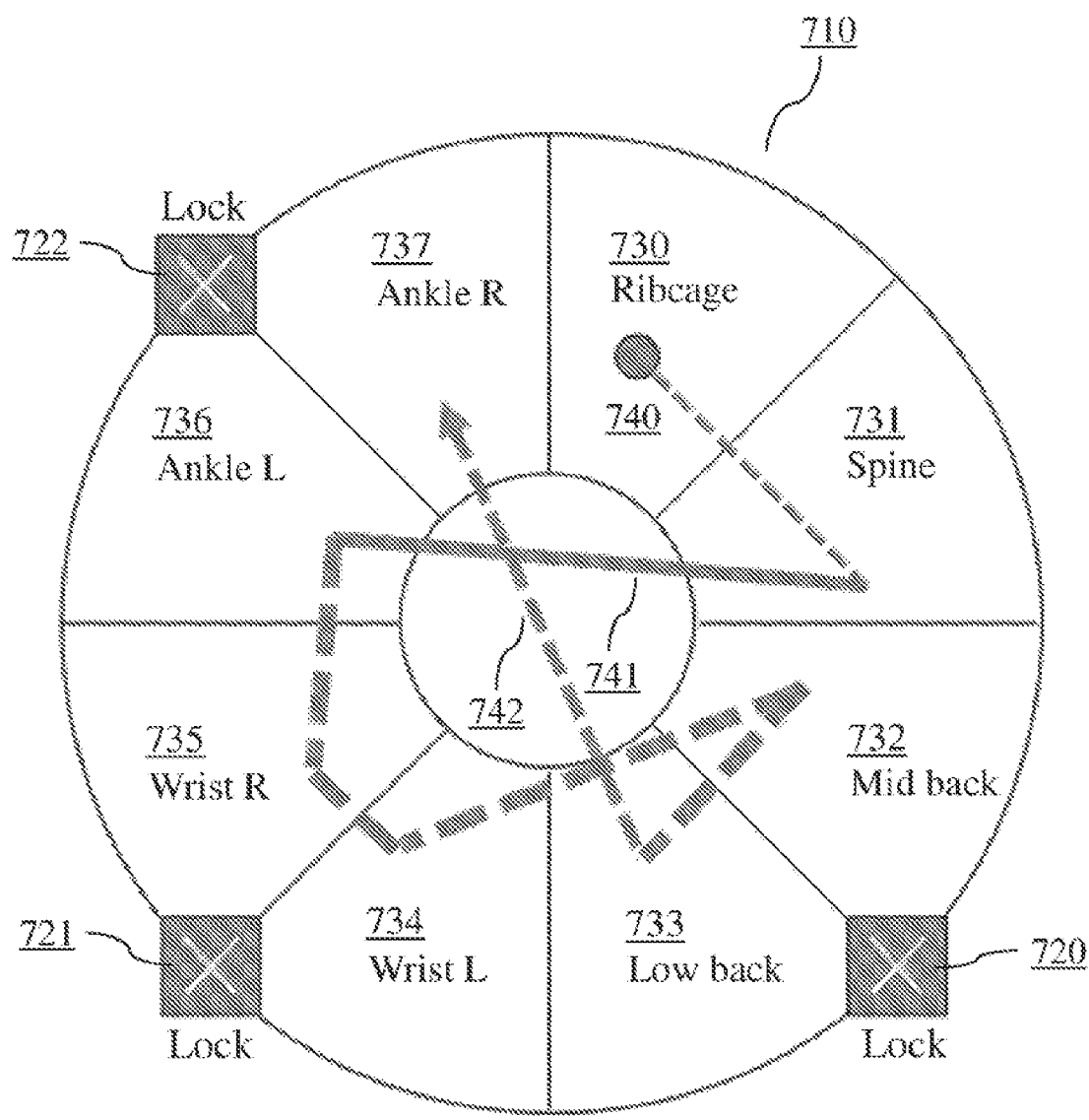
FIG. 7 is an exemplary diagram of a movement wheel device that may be used to implement aspects of certain embodiments of the present invention.

FIG. 7 is a grayscale version of an exemplary embodiment of the movement wheel 700. In the embodiment of the present invention, the movement wheel 710 can be used to easily create or craft the sensation of vibrotactile movement on the body of a user, and it allows a vibrotactile creator to control movement and intensity.

Each section of the embodiment of FIG. 7 shows a different part of the body, such as the ribcage 730 section of the body, the spine 731, the mid back 732, the low back of the body 733, the left wrist 734, the right wrist 735, the left ankle 736, the right ankle 737 of a human body. Each module of the moment wheel 710 could be color coded, labeled or add a patter that would be associate to a specific part of the body described within the embodiment of the moment wheel 710.

In certain embodiments, the vibrotactile creator may simultaneously use the movement wheel 710 and the Brownian grain display 1210 to draw a path 740 that represents the movement from one part of the body to the other controlling the intensity of the line as it is drawn and the graininess of it. The thickness of the line is directly related to the intensity of the vibration. The thinner the line, the weaker the vibration and the thicker the line the stronger the vibration. Each line has the possibility of been drawn with different intensities as the user moves throughout the movement wheel 710. The movement varies with intensity in time.

For example, the user may start to draw the path 740 in the mid back 732 and move down to the low back 733. As the path moves down the vibrations could increase or decrease in intensity. In certain embodiments of this invention, the path 740 drawn by the vibrotactile creator may depict smooth lines 741 or dotted lines 742. Dotted lines 742 will indicate that in that specific vibration a degree of graininess is applied. Smooth lines 741 will indicate that in that specific part of the path 740 graininess was not applied.

In certain embodiments, the vibrotactile wheel 710 and the Brownian grain display 1210 may be visualized as a dynamic display that has to be operated at the same time to craft the vibrations as the sound is being played. Their operation could depend, for example, on the operation of a mouse or a touch screen to draw the path 740 of the movement and the intensity of the lines, and an expression pedal to select the level of graininess for the purpose of making the experience more dynamic.

In certain embodiments of the movement wheel 710, the user may lock adjacent positions of the body, toggling a switch with a feature called "lock group" herein. For example, the left ankle 736 may be locked with the right ankle 737 using the lock group option 722. Similarly, the left wrist 734 may be locked with the right wrist 735 with lock group option 721, and the low back position 733 may be locked with the mid back position 732 with lock group 720. A lock group may be used to automatically replicate the vibration created for one area into whichever area is locked with it. When a lock group feature is on, in certain embodiments one vibration triggers both parts of the body for symmetry.

Figure 8:
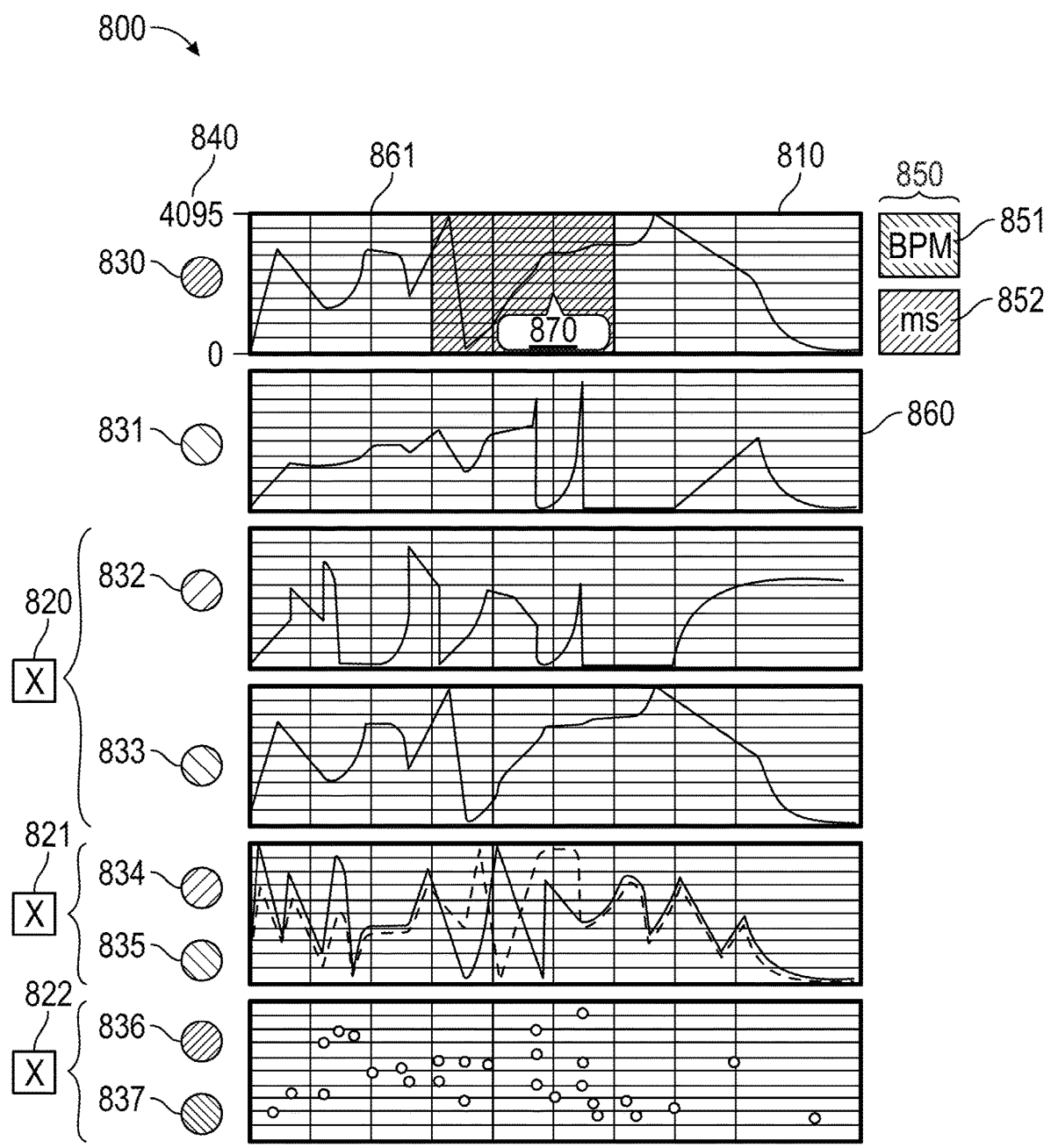
FIG. 8 depicts an exemplary timeline chart that enables the vibrotactile creator to draw intensities over time, according to certain embodiments of the present invention.

FIG. 8 is a grayscale version of an exemplary embodiment of the timeline chart 800, which enables the vibrotactile creator to draw intensities over time for an specific part of the body.

In the embodiment of FIG. 8, the intensity values 840 range from 0 to 4095. These ranges of values are represented in the timeline 810 by horizontal lines 860 parallel to the x axis, and they show the intensity of the vibration. Time is measured along the x axis in intervals marked by vertical lines parallel to the y axis; these intervals are called tempo 861, and they represent the time that it is taking the vibration to move across intensities. The tempo 861 helps to divide the wave sound representation 910 into segments, in order to have a better visualization of the waveform at any given time. The time 850 in the timeline chart 810 can be adjusted in milliseconds 852 or beats per minute BPM 851. This visual aid may help to craft the vibration for the particular part of the piece that is being played.

In the embodiment of FIG. 8, the timeline 810 may feature the same body part names and/or colors as the movement wheel 710, but arranged in channels. In certain embodiments, channel 830 corresponds to the ribcage, channel 831 is the spine, channel 832 corresponds to the mid back, channel 833 to the low back, channel 834 and 835 correspond to the left and right wrist respectively, and channels 836 and 837 correspond to the left and right ankles.

Because the embodiment of the timeline 810 may feature the individual body parts, also seen in the embodiment of the movement wheel 710, the vibrotactile creator or user can concentrate in crafting the vibrations one part of the body at a time. Each body part has its own channel (830, 831, 832, 833, 834, 835, 836 and 837) in certain embodiments, which means that the user can mute all but one channel and begin the crafting process for an individual body part, or, if using the lock group feature (820, 821 and 822), for a set of body parts. These lock group features are also seen in the embodiment of the movement wheel 710.

The gray area shown in the ribcage timeline chart 830 is an exemplary depiction of an area called a loop point 870. This area may be selected to be repeated for purpose of editing and/or for playing back an audio file. The loop point 870 selection within a channel may be a particular part of the timeline or the entire timeline, the vibrotactile creator 620 can change the size of the loop point.

The waveforms or "vibrotactile forms" shown in the embodiment of FIG. 8 represent vibrations. In certain embodiments of the present invention, these vibrotactile waveforms allow the user of the sound vest system to feel different type of vibrations. For example, dots may feel different from line-based waveforms.

FIG. 8 depicts a visual example of the vibration that may occur in each channel. This example shows the vibrotactile forms for the vibrations on the ribcage 830, the spine 831, the mid back 832, the low back 833, the left wrist 834, the right wrist 835, left ankle 836 and the right ankle 837.

Figure 9:
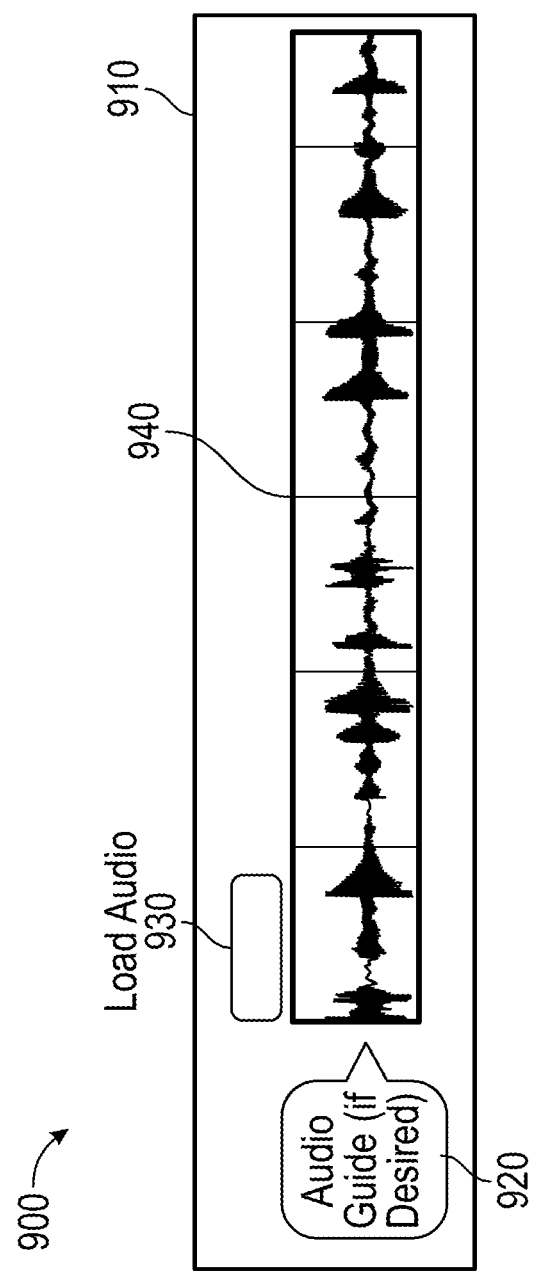
FIG. 9 is an exemplary diagram of a wave sound representation, which is a standard audio file representation that can be utilize as an audio guide, according to certain embodiments of the present invention.

FIG. 9 is a grey scale version of a wave sound representation of a standard audio file 900. In the embodiment of FIG. 9, the wave sound representation 910 may be loaded (see LOAD AUDIO button 930) into the VCS 610 so it can be visualized in the display of the audio guide 920 to be used when crafting vibrations. The lines that divide the audio guide represent the tempo 940. The tempo lines 940 of the standard audio file align with the tempo lines 861 of the time line as shown in FIG. 8.

Figure 10:
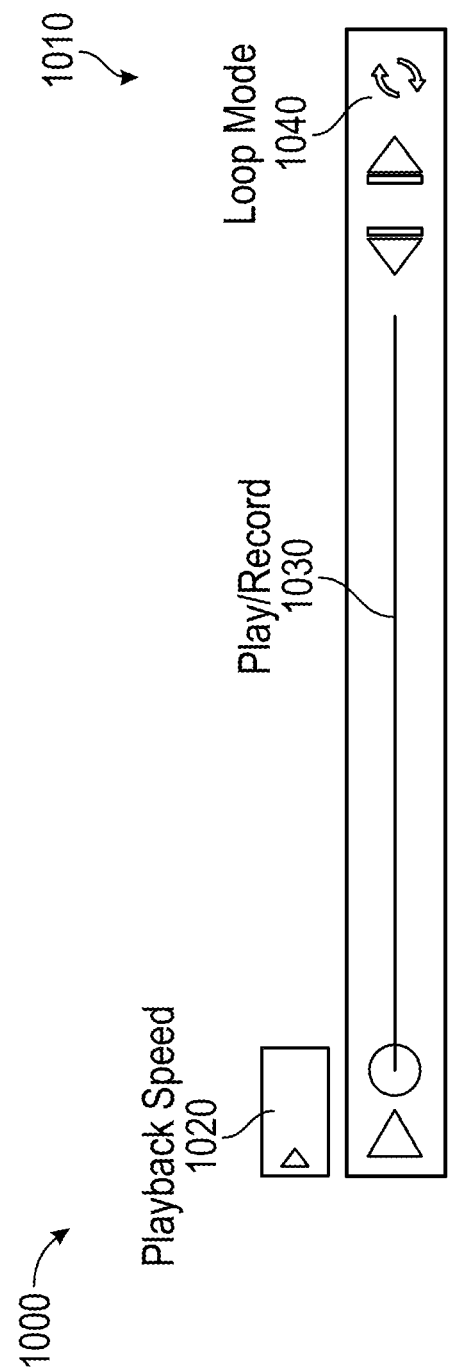
FIG. 10 depicts an exemplary play/record bar that controls the system play and record engine, according to the embodiments of the present invention.

A grey scale representation of a bar 1000, shown in the embodiment of FIG. 10, controls the play and record engine of the system. The playback speed 1020 can be adjusted in the corresponding box. The negative values play the file backwards, and the positive values play the file forwards 1030. The loop mode 1040 may be set to: (1) off (i.e., circular, goes to the end and starts again); or (2) palindrome (i.e., goes to the end and plays backwards to the beginning).

For example, when a sound file is played in the play and record engine of the exemplary system 1010 shown in FIG. 10, the sound may be visualized as a wave sound representation 900. This visual match may help the vibrotactile creator 620 to craft the vibrations for the specific part of the piece that is being played, visualizing the vibrations in the channels of the timeline 810.

Figure 11:
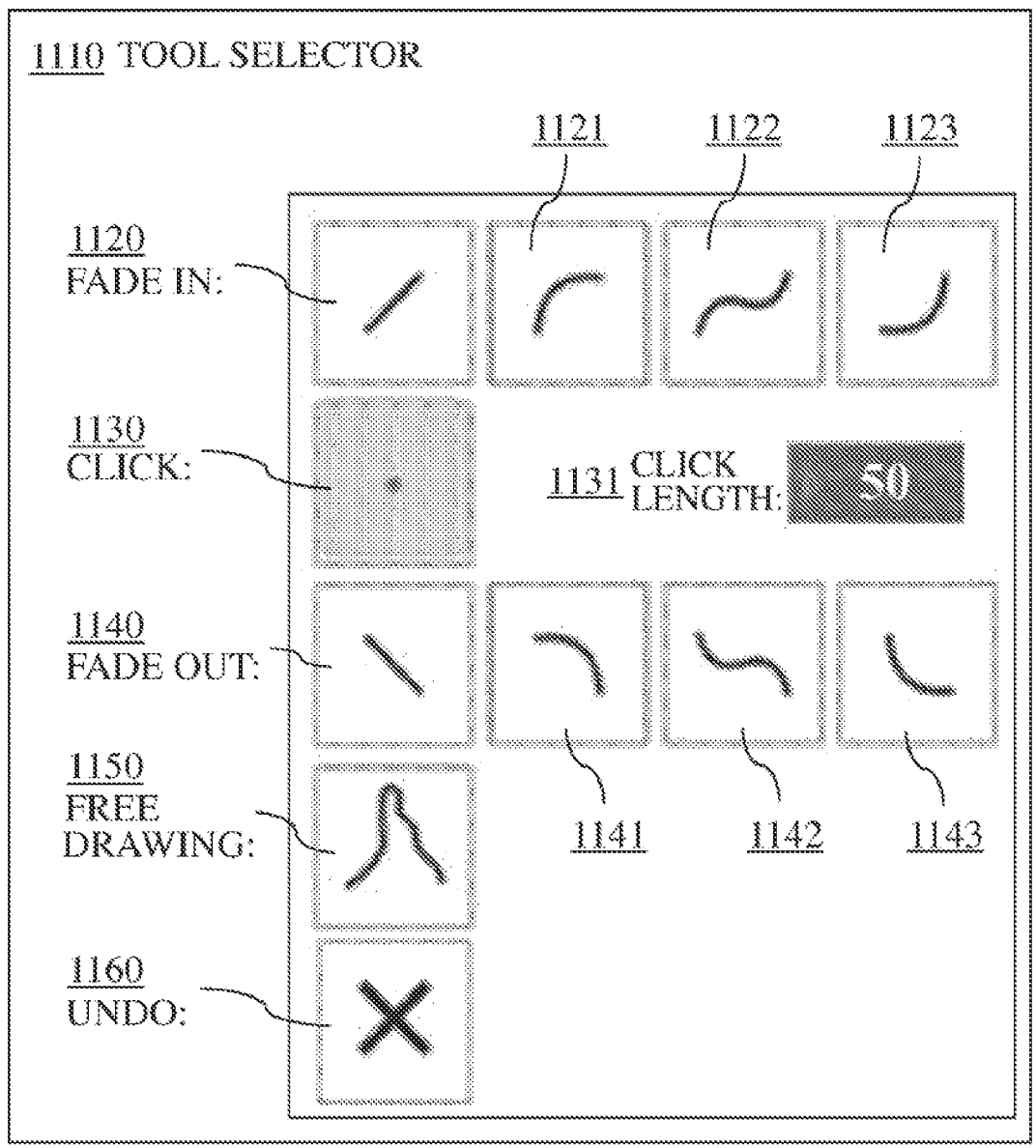
FIG. 11 depicts an exemplary tool selector to draw the desired shape on the timeline, according to the embodiments of the present invention.

In the embodiment of the tool selector 1100 shown in FIG. 11, the user may select a tool from the tool selector 1110 to draw the desired shape on the timeline 810. The tool selector 1110 works like a photo editor or an audio distorted station, because it lets the user select what kind of line it would be used to craft the waveforms in the timeline 810.

The tool selector depicted in FIG. 11 may be used to implement embodiments of the present invention. For example, when the user works with the linear "fade in" part of the tool selector 1110, he or she may draw a part of the waveform that would be a straight line 1120. When 1121 is chosen, it depicts a movement that goes fast at first and then slows down at the end; 1123 would be the opposite to 1121. The s-curve 1122 shows a combination of the movements described in 1121 and 1123, where the waveform moves fast initially, then stabilizes in a plateau, then ends with a fast movement towards the maximum vibration. This type of moment may emulate what is called in music a psychoacoustic emotional effect. The user may feel a sudden burst of vibration followed by a plateau that will have him/her in suspense and then another burst of vibration. It may have an emotional effect.

In vibrotactile language according to certain embodiments, 1130 is called a click herein. In the display 1110, it is the equivalent of a staccato note in music. The click 1130 may be set 1131 from 10 to 50 milliseconds. After 50 milliseconds it turns into a small line because the vibration achieved is not a click per se but a short buzz. The click cannot last more than 50 milliseconds, its maximum value, otherwise it is received as a line, not a dot. But also, it cannot be shorter than 10 milliseconds because it may be hard to perceive due to the spinning limitation of the eccentric rotating mass vibration motors (ERM) used as vibrotactile actuators in certain embodiments. The ideal click using this technology may be between 30 and 50 milliseconds, based on experimental results.

In the embodiment of FIG. 11, the fade-out display that comprises 1140, 1141, 1142 and 1143 works opposite to the fade in display (1120, 1121, 1122 and 1123). Instead of fading in a vibration, it fades out.

The free-drawing display may allow the user to draw an uneven line. For example, if the main display timeline 810 is in a touch screen a user could create any line shape and it would create endless possibilities for the waveforms. Finally, the undo button 1160 is provided to remove any part of the wave form in the timeline 800 that the user does not want to use anymore.

When the tool selector 1100 fade-in and fade-out waveforms are visualized in the main display 600, the user can modify them by changing the time or the amplitude. This gives the craft of the vibration endless possibilities.

Figure 12:
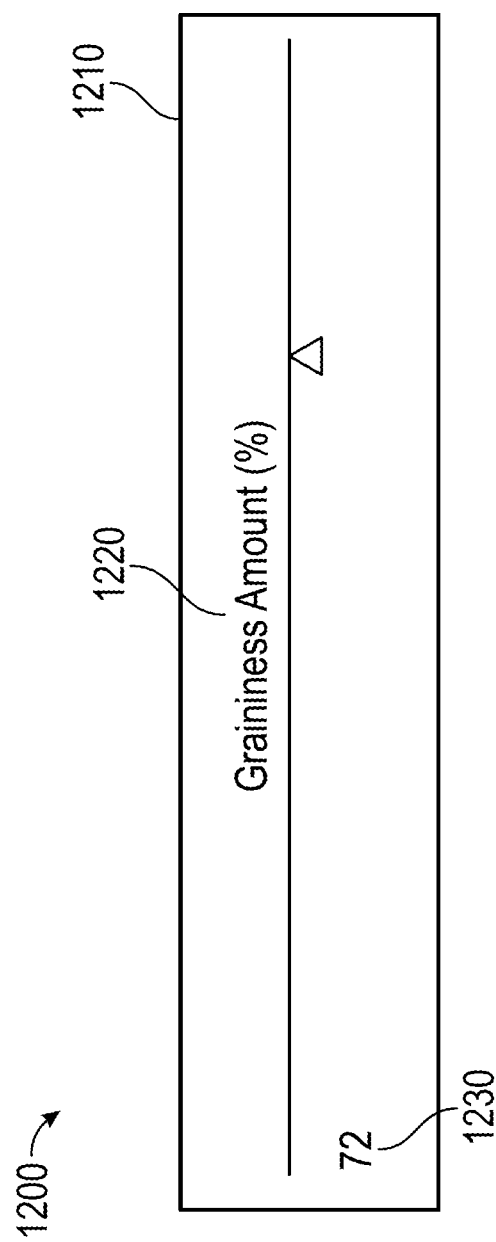
FIG. 12 depicts an exemplary Brownian grain display according to embodiments of the present invention. The graininess created, adds a Brownian random generator that increases the seed size so the values wiggle around each given number instead of ramping up straight.

In the embodiment of FIG. 12, the graininess amount 1210 creates a vibration that is not smooth. It is a type of noise in the vibration, that would distort a smooth vibration, creating crackling. The graininess amount 1220 can be set from 0 to 100% as shown in exemplary embodiment of FIG. 12. The graininess may add a Brownian random generator effect 1200 that increases the seed size 1220 so the values "wiggle" around each given number instead of ramping up straight. The effect may feel like a vibrotactile distorted guitar; it may add expressiveness and interest to an otherwise clean signal.

The visual expression of graininess is given in the embodiment of the movement wheel 710. When graininess is applied the otherwise smooth lines 741 in the drawn path 740 will acquire spaces, like dotted lines 742 that will represent unevenness.

Figure 13:
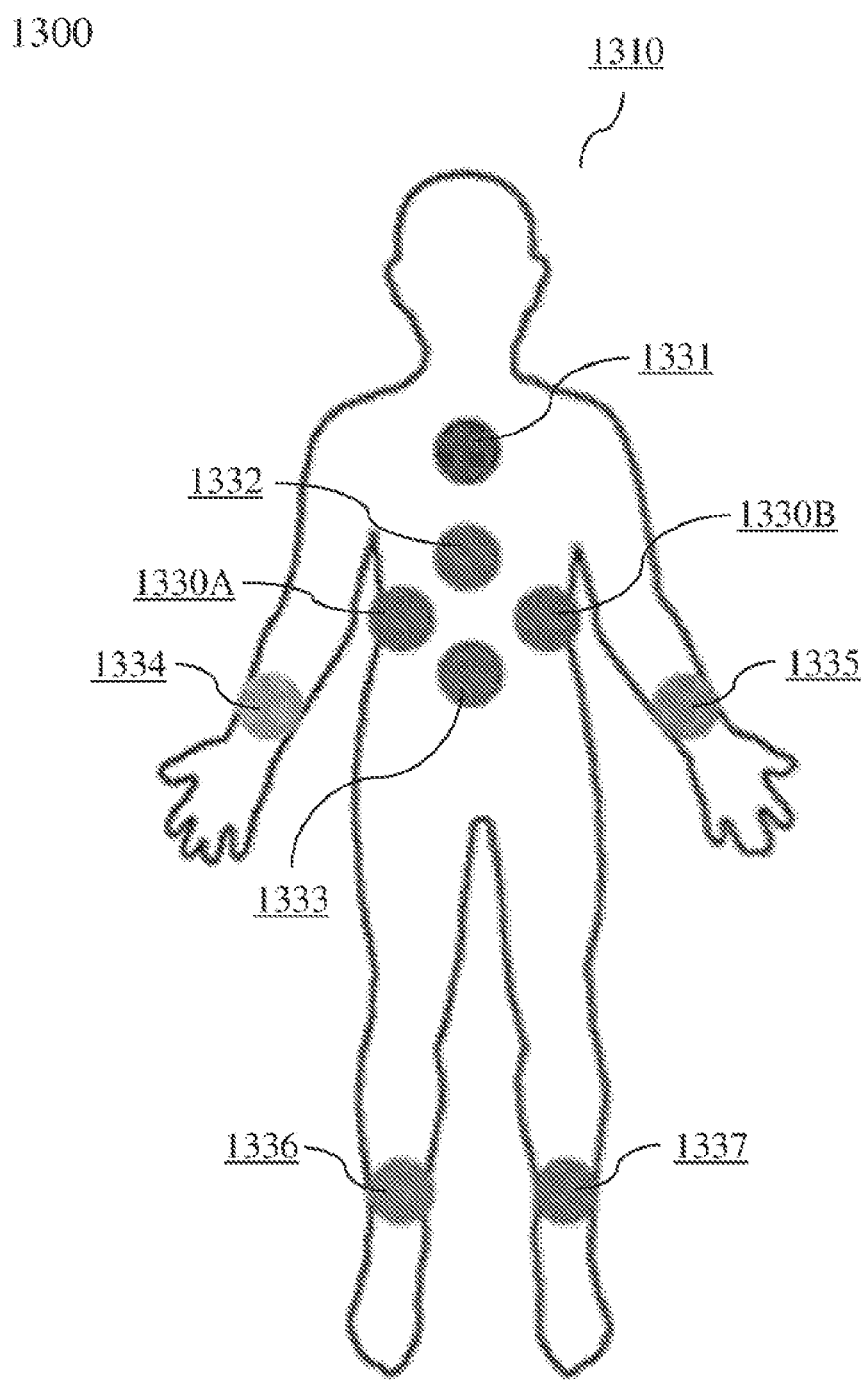
FIG. 13 is an exemplary diagram of a vibrotactile body display VBD showing the points of the body being vibrated at any given time at a given intensity, according to embodiments of the present invention.

FIG. 13 presents an embodiment of the vibrotactile body display VBD 1310. This embodiment shows the points of the body being vibrated at any given time at a given intensity. The gray scale points (1330A, 1330B, 1331, 1332, 1333, 1334, 1335, 1336, 1337) may correspond to the gray scale colors on the movement wheel 710 and the grey scale colors in the timeline 610, for cohesiveness. The stronger a color is seen on the display, the stronger the vibration is on that point.

Figure 14:
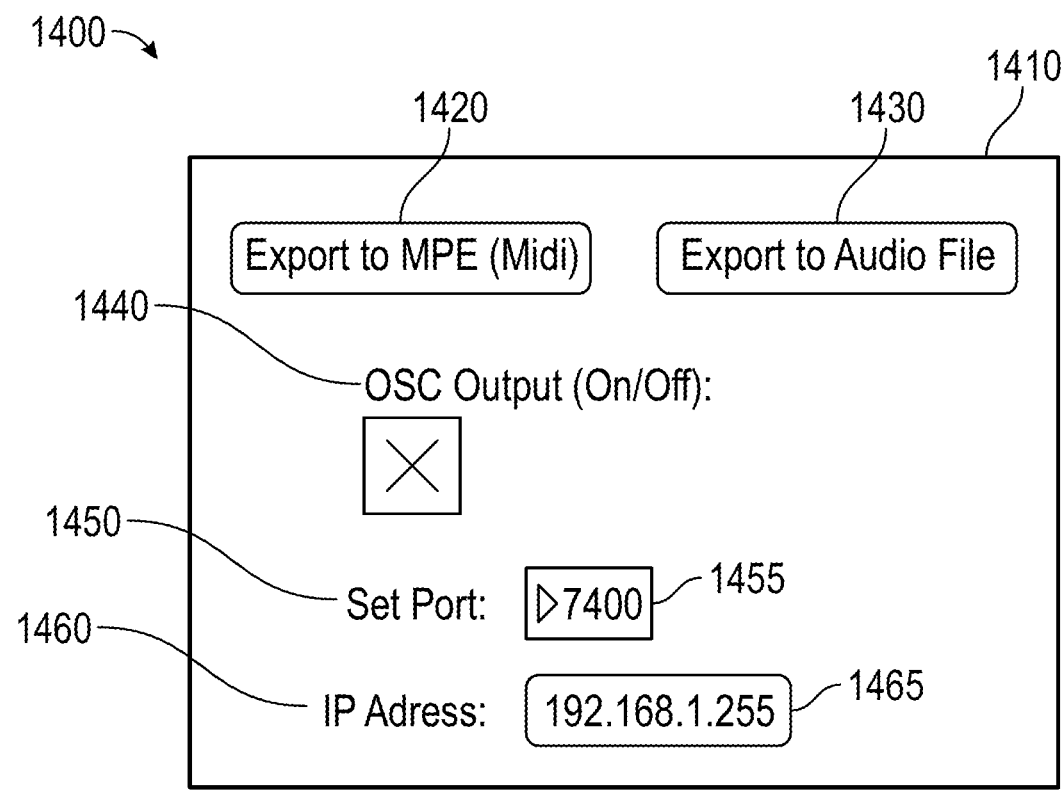
FIG. 14 depicts an exemplary file export display that will export a file to a MPE MIDI file or an eight-channel .aiff file that may be used to implement aspects of certain embodiments of the present invention.

After the vibrotactile creator or user is finished crafting the experience, in certain embodiments he or she can then export the file to a MPE (multidimensional polyphonic expression) MIDI file 1410, as shown in FIG. 14. In the embodiment of FIG. 14, the user may export to a MPE (midi) file 1420, allowing the vibrotactile creator to control the video notes, this would typically not be possible without the MPE (midi) file. The user may also export into an eight channel .aiff audio file 1430. The user may turn on Open Sound Control OSC 1440 on and off to send the data in real time to other applications (e.g., audio, video and lighting software for example). The set port 1450 can be customized, traditionally to 7400-7500 (1455) for sending out the vibrations to an access point so it can be transmitted to the wearer's body wirelessly and finally the user can type in (see 1060) the Internet Protocol ("IP") address 1465 needed for OSC output in the network, Internet, Ethernet, etc.

Certain embodiments implement methods and systems for creating and/or applying vibrations to a user's body, including simultaneous stimulation of multiple parts of a user's body during gaming sessions such as in virtual reality ("VR") applications. According to aspects of the present invention, in certain embodiments, vibration stimuli matching the audio and/or visual effects found in VR environments are applied to a user's body, and in some of those embodiments, two or more such stimuli are applied simultaneously to different parts of a user's body.

Methods and systems implemented in certain embodiments use what is call "haptic panning" herein. This is similar to audio panning—when viewers watch a car moving from left to right on a screen they can also hear the sound following the image. The sound does not actually "move" with the car. The speakers placed at the left and right of the screen modulate the intensity of the sound according to well-known equations to create the illusion of movement of the sound source.

Likewise, various methods may be implemented similar to those known to skilled artisans for panning audio (e.g., constant power, vector-based amplitude panning (VBAP), ambisonics, etc.) to move vibrations around the body of a user. So, if it goal is to "move" the vibrations from left wrist to right wrist, for example, the following three different stages are implemented in certain embodiments: (A) "Left", vibrations at 85% on Left Wrist, 10% on Ribcage, 5% on Right Wrist; (B) "Center," vibrations at 10% on Left Wrist, 80% on Ribcage, 10% on Left Wrist; (C) "Right," vibrations at 5% on Left Wrist, 10% on Ribcage, 85% on Right Wrist. Any desired "movement" can be implemented following variations of this technique, from any point A to point B, passing through the areas in between.

Methods and systems implemented in certain other embodiments use what is called "hit spreading" herein. For example, if a game character is punched in the stomach, the user should also feel the energy of the punch going all the way to the user's back. In a VR simulation, when an area is hit by a punch, a fireball, or any other of form of energy that hits the user's character in the virtual world, the energy will spread to other areas. If a virtual enemy launches a fireball and the character defends it with bracelets, in the real world the energy felt vibrating on the user's wrist that got hit will trigger vibrations on the ribcage with less intensity and on the back with even less intensity.

In certain other embodiments, for example, a game character may enter a zone with a "force field," and in response in the real world, the vibrations get stronger in the area of the body that is closer to the field but other areas of the user's body will vibrate as well, although with less intensity.

In certain other embodiments, what are called the "Laser Sword Penetration" methods and systems herein can be understood as vibrations spreading on the areas that are being poked by a sword, but in order to make the effect more compelling, the vibrations also pulse in the neighboring areas, though with less intensity.

While the above description contains many specifics and certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those ordinarily skilled in the art, as mentioned above. The invention includes any combination or sub combination of the elements from the different species and/or embodiments disclosed herein.

The invention claimed is:

1. A system comprising:
a plurality of wearable vibratory motors comprising:
 a first motor configured to be disposed over a user's first wrist or ankle; and
 a second motor configured to be disposed over the user's second wrist or ankle; and
a signal processor configured to receive an input signal and generate a plurality of electrical driving signals in real time,
wherein the plurality of electrical driving signals generated by the signal processor are configured to drive the plurality of vibratory motors according to a predefined mapping of portions of the input signal to the plurality of vibratory motors.

2. The system of claim 1, wherein the plurality of vibratory motors are coupled to one or more wearable articles.

3. The system of claim 1, wherein each of the plurality of vibratory motors is coupled to a strap configured to be worn about the user's first wrist or ankle or the user's second wrist or ankle.

4. The system of claim 1, wherein the plurality of vibratory motors further comprises at least a third motor coupled to a wearable vest.

5. The system of claim 1, wherein the vibratory motors are wirelessly coupled to the signal processor.

6. The system of claim 1, wherein the input signal comprises real-time audio detected via one or more microphones.

7. The system of claim 1, wherein the input comprises a pre-recorded audio signal.

8. The system of claim 1, wherein the signal processor is configured to generate the electrical driving signals such that at least two of the vibratory motors vibrate at different frequencies from one another.

9. A system comprising:
a plurality of vibratory motors comprising:
 a first motor configured to be disposed over a user's first wrist or ankle; and
 a second motor configured to be disposed over the user's second wrist or ankle; and
a signal processor communicatively coupled to the plurality of vibratory motors, the signal processor configured to:
 receive an input signal; and
 based at least in part on the input signal, and according to a predefined mapping of the input signal to the plurality of vibratory motors, generate a plurality of electrical driving signals.

10. The system of claim 9, wherein the plurality of vibratory motors further comprises at least a third motor coupled to a wearable vest.

11. The system of claim 9, further comprising one or more microphones, wherein the input signal comprises real-time audio detected via the one or more microphones.

12. The system of claim 9, wherein the input signal comprises a pre-recorded audio signal.

13. The system of claim 9, wherein the signal processor is configured to generate the electrical driving signals such that at least two of the vibratory motors vibrate at different frequencies from one another.

14. A method comprising:
disposing a plurality of wearable vibratory motors about a user such that:
 a first motor is disposed over the user's first wrist or ankle; and
 a second motor is disposed over the user's second wrist or ankle;
receiving, at a signal processor, one or more input signals;
generating, via the signal processor, a plurality of electrical driving signals for the plurality of vibratory motors in real time and according to a predefined mapping from the one or more input signals to the plurality of vibratory motors; and
providing the electrical driving signals to the plurality of wearable vibratory motors such that the first motor vibrates against the user's first wrist or ankle and the second motor vibrates against the user's second wrist or ankle.

15. The method of claim 14, wherein the vibratory motors are coupled to one or more wearable articles.

16. The method of claim 14, wherein the plurality of wearable vibratory motors comprises at least 4 vibratory motors.

17. The method of claim 14, wherein the vibratory motors are wirelessly coupled to the signal processor.

18. The method of claim 14, wherein the input signal comprises real-time audio detected via one or more microphones.

19. The method of claim 14, wherein the input signal comprises a pre-recorded audio signal.

20. The method of claim 14, wherein the signal processor is configured to generate the electrical driving signals such that at least two of the vibratory motors vibrate at different frequencies from one another.

\* \* \* \* \*